United States Patent
Shockley et al.

(10) Patent No.: US 7,391,818 B1
(45) Date of Patent: *Jun. 24, 2008

(54) ENERGY-CONTROL AND PATH-SELECTION METHOD AND APPARATUS FOR DIGITAL DIVERSITY SIGNALING

(75) Inventors: Richard Condit Shockley, San Diego, CA (US); Andrew J. Cameron, Seattle, WA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/745,752

(22) Filed: May 8, 2007

Related U.S. Application Data

(63) Continuation-in-part of application No. 10/335,288, filed on Dec. 31, 2002, now Pat. No. 7,286,607.

(51) Int. Cl.
*H04B 7/02* (2006.01)

(52) U.S. Cl. .................... 375/267; 375/295; 375/316; 375/347

(58) Field of Classification Search ................ 375/267, 375/295, 316; 455/450, 509
See application file for complete search history.

(56) References Cited

U.S. PATENT DOCUMENTS

| | | | | | |
|---|---|---|---|---|---|
| 5,166,894 | A | * | 11/1992 | Saito | 708/200 |
| 6,266,323 | B1 | * | 7/2001 | Valko et al. | 370/230 |
| 6,405,046 | B1 | * | 6/2002 | Kumaran et al. | 455/453 |
| 7,130,273 | B2 | * | 10/2006 | Baj | 370/242 |

\* cited by examiner

*Primary Examiner*—Mohammad H. Ghayour
*Assistant Examiner*—Sophia Vlahos
(74) *Attorney, Agent, or Firm*—Peter A. Lipovsky; J. Eric Anderson; Ryan J. Friedl

(57) ABSTRACT

A method and apparatus is provided for communicating digital information using diversity signaling with a constrained amount of transmission energy per bit available. The method may optimize the number of diversity channels used, optimize the energy allocation emitted per bit on each diversity channel, and apply weighting factors to each diversity channel at the receiver. One method includes initializing one or more channels J from $J_m$ channels, calculating a Chernoff bound $B^{(J)}$ for the one or more channels J, determining whether J+1 channels may be energetically allowed, and transmitting digital information m using the one or more channels J if the J+1 channels are not allowed or if the J+1 number of channels may be selected but the Chernoff bound $B^{(J)}$ is minimized.

21 Claims, 8 Drawing Sheets

ENERGY-CONTROL AND PATH-SELECTION METHOD AND APPARATUS FOR DIGITAL DIVERSITY SIGNALING

CROSS-REFERENCE TO RELATED APPLICATIONS

This application is a continuation-in-part of commonly-assigned U.S. application Ser. No. 10/335,288 (Navy Case No. 80,109), filed Dec. 31, 2002 now U.S. Pat. No. 7,286,607, entitled "Energy-Control Method and Apparatus for Digital Diversity Signaling," the content of which is fully incorporated by reference herein.

BACKGROUND

The Energy-Control and Path-Selection Method and Apparatus for Digital Diversity Signaling relates generally to the field of digital signal communications.

Digital communications systems frequently operate in fading channels, meaning that the amplitude and phase of a signal at the receiver are random variables. In a widely used analytic model for fading, the Rayleigh-fading channel with additive Gaussian noise, the likelihood of deep fading increases the error probability compared to non-fading channels. An increased error probability increases the likelihood that a transmitted "0" will be interpreted as a "1" by the receiver, or vice versa. Diversity signaling may be used to compensate for fading. Diversity signaling is the transmission of the same bit or set of bits to the same antenna multiple times, or transmission of the same bit or set of bits to multiple antennas. Diversity signaling can be performed by various means, including the use of several carrier frequencies, known as frequency diversity, or spatially separated antennas, called spatial diversity. Examples of other types of diversity include time, polarization, and path diversity.

Some methods for combining received diversity signals include maximal ratio combining, equal-weight combining, and selection diversity. Maximal ratio combining maximizes the mean signal-to-noise ratio (SNR) of the combined diversity transmissions in exactly the same fashion as a matched filter. Equal-weight combining involves processing received signals, such as by base-banding and filtering for the low-pass waveforms being sought, and summing the received diversity channels. Selection diversity uses a subset of all diversity channels, namely those with the largest SNRs, which are then combined with equal weights.

Conventional diversity systems typically do not transmit different energies on different diversity channels. For example, in some applications receivers or transmitters must be lightweight, battery powered, portable, and may need to operate in conjunction with several similar devices. These requirements limit the measurements, calculations, or adaptations the device or set of devices can perform to only the simplest types of diversity combining. Another reason diversity systems typically do not employ different energies on different diversity channels is that system designers often assume for simplicity that the noise and transmission loss are equal for each prospective diversity channel. Generally however, neither noise nor transmission loss are apt to be identical on all possible diversity channels. Therefore, it would be desirable to have a method for optimum energy-control in a diversity signaling system.

DETAILED DESCRIPTION OF SOME EMBODIMENTS

Figure 1:
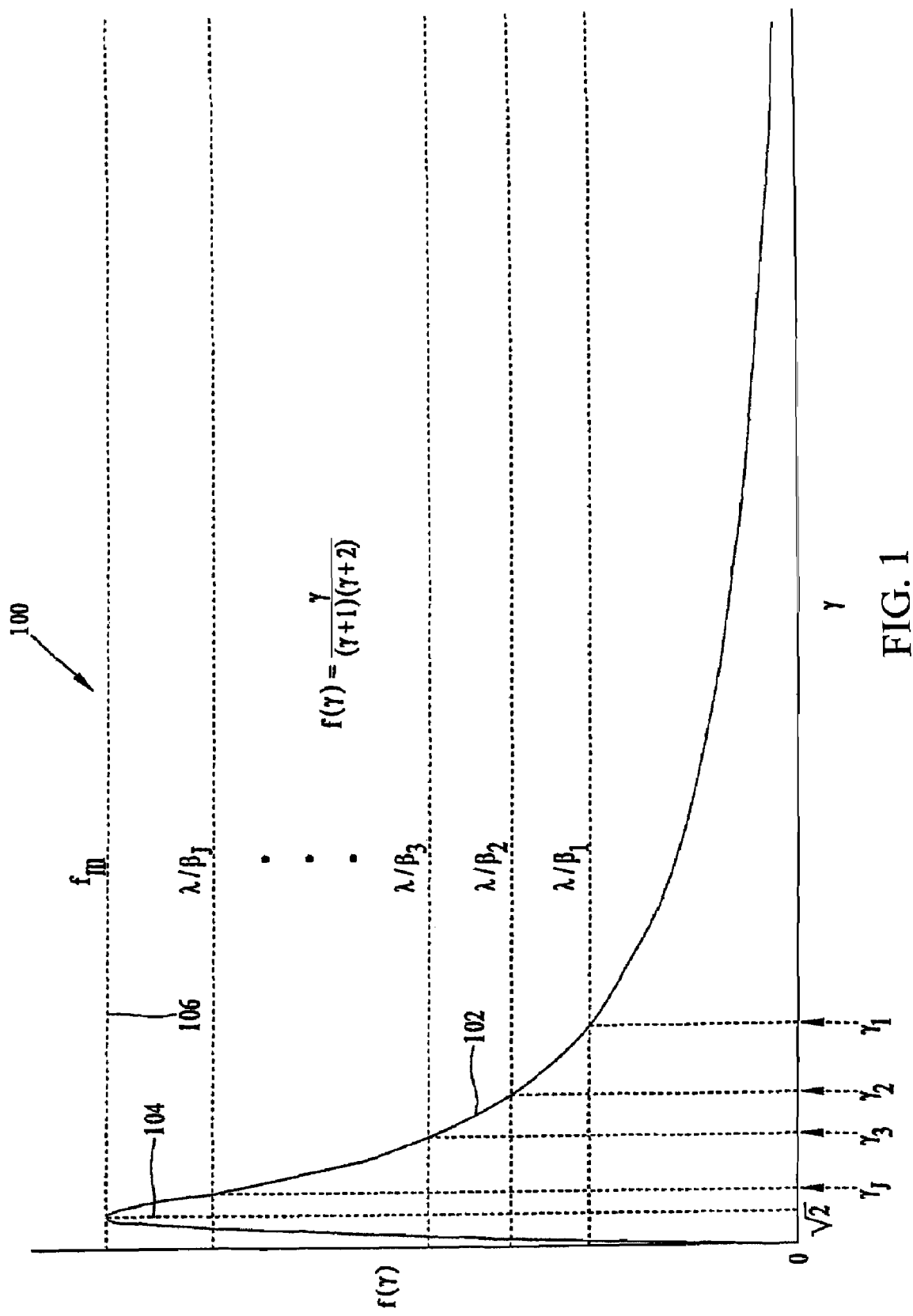
FIG. 1 shows a graph of a function that may be used to calculate channel energy per bit allocations, in accordance with an embodiment of the Energy-Control and Path-Selection Method and Apparatus for Digital Diversity Signaling.

FIG. 1 shows a graph 100 of a function $$f(\gamma) = \frac{\gamma}{(1+\gamma) \cdot (2+\gamma)}$$

that may be used to calculate channel energy per bit allocations in accordance with an embodiment of the energy control and path selection method and corresponding apparatus for digital diversity signaling. Function $f(\gamma)$, represented by curve 102, may be used to find the optimum energy per bit $E_j$ to be transmitted on channel j, for j=1, 2, ..., J, to reduce the effects of fading in digital communications systems. The energy $E_j$ may be computed from the value of $\gamma_j$ at which the function $f(\gamma)$ satisfies the equation $f(\gamma_j)=(\lambda/\beta_j)$ (equation 1), with $\lambda$ being a constant, $\gamma_j$ average received SNR, $\gamma_j=\beta_j E_j$, and $\beta_j$ being a property of channel j that may be defined by the equation $$\beta_j = \frac{g_j}{N_j},$$

where $g_j$ may be the mean transmission loss and $N_j$ may be the one-sided power spectral density of noise. In general, there may be two solutions to equation 1, one less than $\sqrt{2}$ and the other greater than $\sqrt{2}$. In solving equation 1, the solution greater than $\sqrt{2}$ should be chosen.

Equation 1 is derived from a formula for the maximum possible value of the probability of a bit-error in binary diversity signaling in the presence of Rayleigh fading and additive Gaussian noise, $$P[E] \le \prod_{j=1}^{J} 4p_j(1-p_j), \quad \text{(equation 2)}$$

where P[E] represents the probability of a bit-error, $p_j$ represents the probability of bit-error for a single transmission of a bit on channel j, $$\frac{1}{2+\gamma_j}.$$

The right-hand side of the inequality of equation 2 is known as the Chernoff bound, meaning upper limit, on P[E]. The value J denotes the number of diversity channels. The Chernoff bound can be minimized subject to the constraint that there is a given fixed value of the sum of the energies $E_j$ transmitted on channels 1 to J by use of a Lagrange undetermined multiplier $\lambda$. The use of the Lagrange undetermined multiplier may be used to produce a set of identical equations, one for each channel, whose simultaneous solution minimizes the Chernoff bound with respect to the SNR $\gamma_j$ on each channel j subject to the constraint of a fixed total transmission energy per bit available $E_{tot}$. The minimization may be obtained by an optimum choice of the set of $E_j$, which may involve setting equal to zero the derivative of the function $$F(E_1, \ldots, E_J; \lambda') = \prod_{j=1}^{J} 4p(1-p_j) + \lambda'\left(E_{tot} - \sum_{j=1}^{J} E_j\right)$$

with respect to each $E_j$. Setting the derivative of the function $F(E_1, \ldots, E_J; \lambda')$ with respect to $\lambda'$ equal to zero is equivalent to the energy constraint. The resulting set of equations yields equation 1 above. Still referring to FIG. 1, the peak of curve 102 occurs at the intersection of dotted line 104 and dotted line 106. Line 104 occurs at a $\gamma$ value of $\sqrt{2}$. Line 106 represents the maximum value of $f(\gamma)$, $f_m$, which may be approximately equal to 0.172.

The set of J equations of the form of equation 1 cannot be solved for $\lambda$, but for any given value of $\lambda$, the values of $\gamma_j$ for $j=1, \ldots, J$ are fixed, as are also the set of transmitted energies $\{E_j\}$ and their sum. FIG. 1 shows that this sum decreases monotonically as $\lambda$ increases. Consequently, $\lambda$ may be adjusted to satisfy the energy constraint, to within some prescribed tolerance, by successive approximations. The optimum number of channels may be found by labeling channels in order of decreasing quality, namely such that $\beta_1 \ge \beta_2 \ge \ldots \beta_{Jm}$, where $J_m$ is the total number of diversity channels available for use in the particular communication system at hand, and comparing successive values of the Chernoff bound for increasing values of J. The Chernoff bound typically decreases for successively larger values of J until reaching a minimum, after which it increases. Hence, the optimum number of channels may be found by noting the first instance of an increase in the Chernoff bound when the next channel is added.

Figure 2:
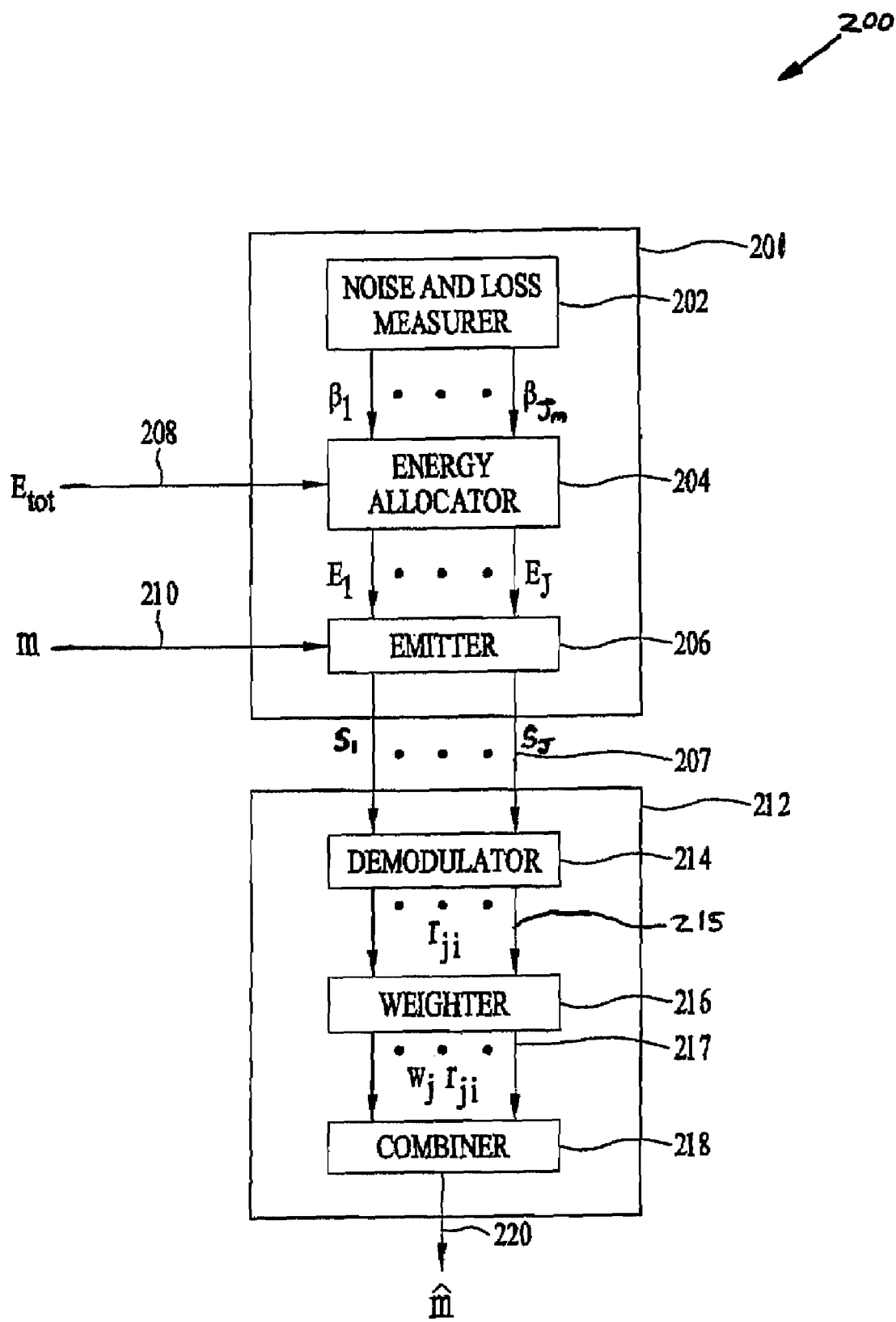
FIG. 2 shows a block diagram of a receiver and transmitter, in accordance with an embodiment of the Energy-Control and Path-Selection Method and Apparatus for Digital Diversity Signaling.

FIG. 2 shows a block diagram of a system 200 for employing an embodiment of the energy control and path selection method for digital diversity signaling. System 200 may include a transmitter 201 and a receiver 212. Transmitter 201 may include a noise and loss measurer 202 which measures channel noise and channel transmission loss on each of $J_m$ channels. The measured values of the channel noise and the channel transmission loss may be used to calculate $\beta$ values, $\beta_1$ through $\beta_{Jm}$, for each of $J_m$ channels.

Energy allocator 204 may receive the $\beta$ values and the total energy $E_{tot}$ 208 available to transmit a bit for the particular communication system. Energy allocator 204 may calculate the number of diversity channels to use and the energy used on each of the channels to transmit a bit, subject to the energy constraint and based upon the $\beta$ values and number of available channels $J_m$. The energy constraint may be satisfied when the sum of the energies $E_1$ through $E_J$ used to transmit a bit on J channels is within a fractional tolerance $\delta$ of $E_{tot}$ 208, that is, when $$\left| E_{tot} - \sum_{j=1}^{J} E_j \right| \le \delta E_{tot},$$

where $0 < \delta \le 1$. By way of example, the allocated energies for transmitting a bit on each channel j may be calculated using the set of equations shown in equation 1 and curve 102 in FIG. 1.

Emitter 206 may receive information m 210 to be transmitted, allocate information m 210 to the J number of channels, and transmit digital signal information 207, represented by $S_1$ through $S_J$, on each of the J channels. Channels 1 through J may contain a respective allocation of channel energies per bit of $E_1$ though $E_J$.

Receiver 212 may receive the transmitted digital signal information 207 from transmitter 201. Demodulator 214 may demodulate digital signal information 207 from each of the J channels. The resulting demodulated information 215, represented by $r_{ji}$, may then be transmitted to weighter 216. The variable $r_{ji}$ may represent the sum of the squares of the projections of the received waveforms on channel j onto the quadrature components of the unit-energy (scaled) form of the transmitted waveforms $S_j(t)$ 207 when $m=m_i$, for $i=1, 2$. Weighter 216 may produce weighted digital signals 217 by weighting demodulated information 215 of each channel j of the J channels according to their channel energy per bit $E_j$ and measurements of channel noise and channel transmission loss. For example, the weight $w_j$ for each channel j may be $$w_j = \frac{\frac{\gamma_j}{N_j}}{1+\gamma_j},$$

where $$\gamma_j = \frac{g_j \cdot E_j}{N_j},$$

with $g_j$ being the transmission gain, $E_j$ being the channel energy per bit, and $N_j$ being the noise power spectral density, all on channel j. Weights $w_j$ may be combined with demodulated information 215 to produce weighted digital signals 217. Combiner 218 may then combine weighted digital signals 217 to produce a digital output signal m̂ 220 that is an estimate of information m 210. Apparatus 200 may be implemented with a variety of diversity techniques including, but not limited to, the following: frequency diversity, spatial diversity, time diversity, polarization diversity, and path diversity. Apparatus 200 may be expanded to include M-ary signaling through the use of a larger set of baseband waveforms.

Figure 3:
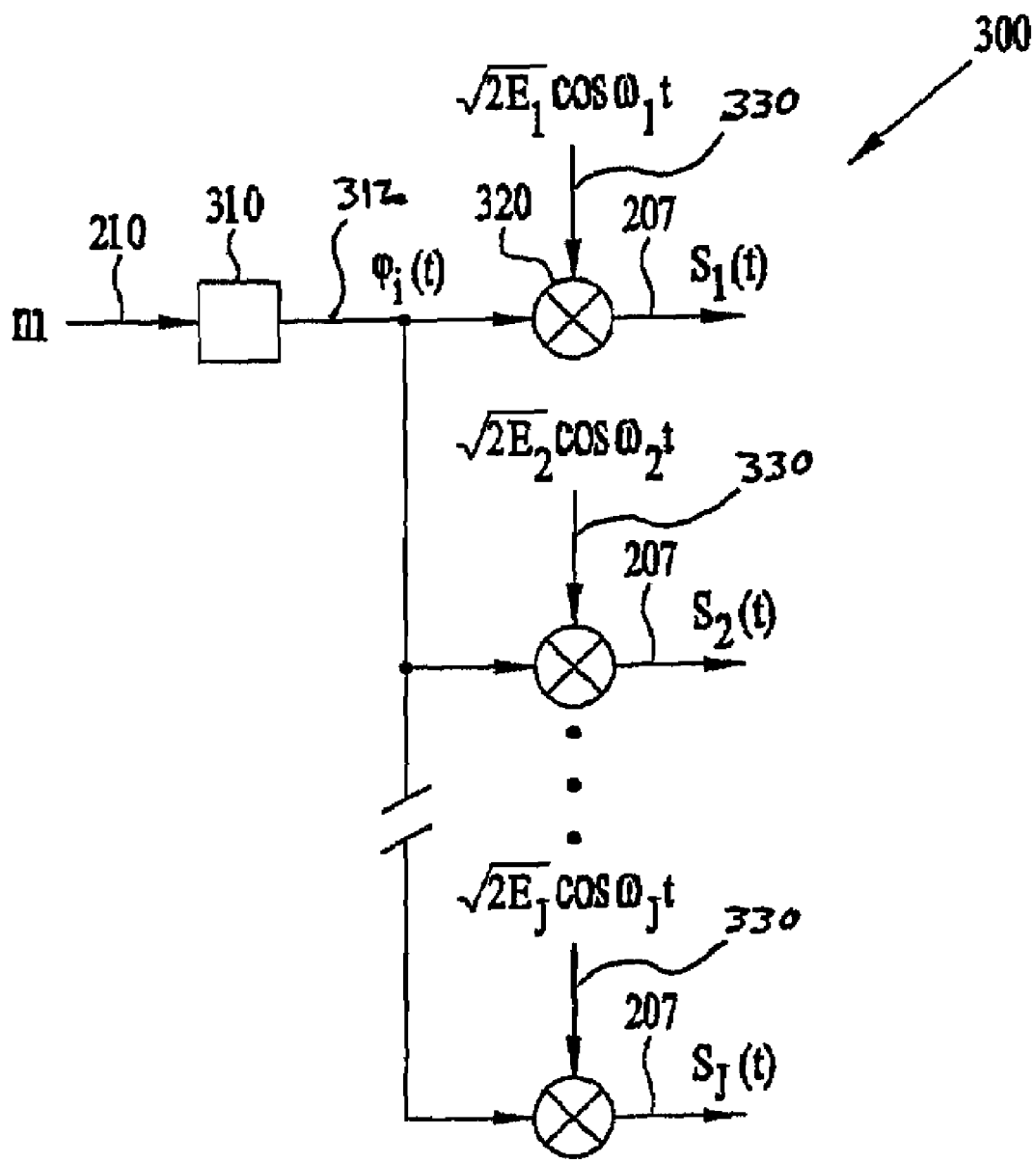
FIG. 3 shows a functional schematic of a transmitter, in accordance with an embodiment of the Energy-Control and Path-Selection Method and Apparatus for Digital Diversity Signaling.

By way of example, FIG. 3 illustrates an embodiment of an emitter 300 for an embodiment of an energy-control apparatus for frequency diversity signaling. Emitter 300 may include a baseband waveform generator 310 and one or more multipliers 320. Information, represented by m 210, may be input into baseband waveform generator 310, which may output baseband waveforms 312 denoted by $\phi_i(t)$, for i=1, 2, corresponding to binary messages $m_1$ and $m_2$, respectively. As shown, baseband waveforms 312 may be sent to multipliers 320 on J channels. Waveforms 312 may be orthonormal. Multipliers 320 may receive a carrier frequency input 330 represented by signals $\sqrt{2E_1}\cdot\cos(\omega_1 t)$ through $\sqrt{2E_J}\cdot\cos(\omega_J t)$, onto which baseband waveforms 312 are modulated to produce the signal waveforms 207, represented by $S_1(t)$ through $S_J(t)$, that are transmitted to a receiver, such as receiver 212 in FIG. 2. Waveforms 207 may each have a respective energy allocation of $E_1$ through $E_J$, and may each have a respective carrier frequency $\omega_1$ through $\omega_J$. The J channels may be a plurality of channels and may be selected from $J_m$ channels. The channel energy per bit allocations $E_j$ of each of the J channels are subject to the constrained amount of transmission energy-per-bit available, $E_{tot}$. The channel energy per bit allocations may be calculated to correspond to the measurements of channel noise $N_j$ and channel transmission loss $g_j$. The sum of the channel energy allocations may be within a predetermined fractional tolerance δ of the transmission energy-per-bit available $E_{tot}$. By way of example, the channel energy allocations may be responsive to the function $$f(\gamma) = \frac{\gamma}{(1+\gamma)\cdot(2+\gamma)},$$

as shown in FIG. 1.

Figure 4:
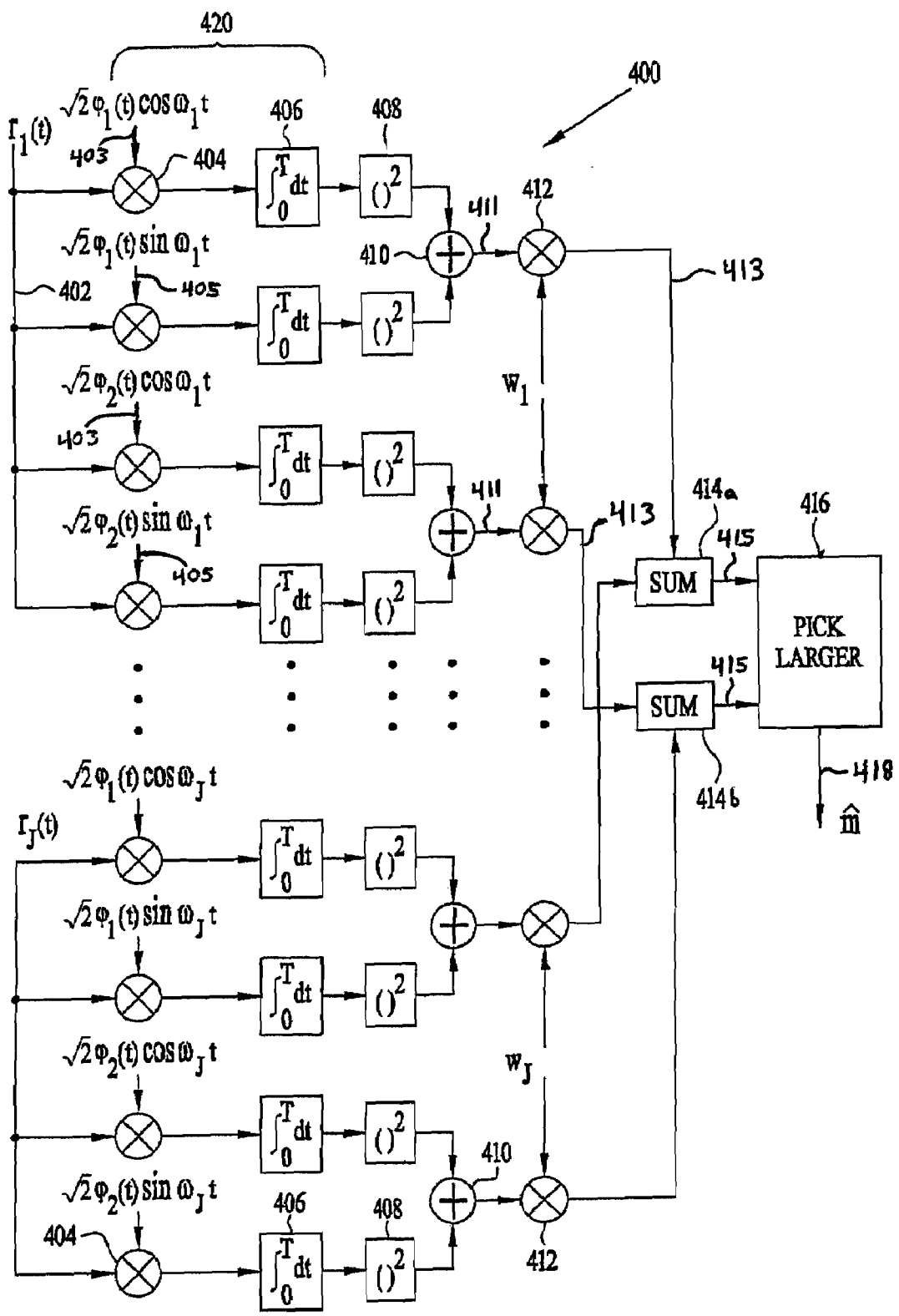
FIG. 4 shows a functional schematic of a receiver, in accordance with an embodiment of the Energy-Control and Path-Selection Method and Apparatus for Digital Diversity Signaling.

FIG. 4 illustrates an implementation of a receiver 400 for an embodiment of the energy-control apparatus for frequency diversity signaling. Receiver 400 may include a demodulator 420, squarer 408, summer 410, weighter 412, summers 414a and 414b, and comparator 416. Demodulator 420 may include multipliers 404 and integrators 406 for projecting the received waveforms 402 on channel 1 onto the cosine and sine components of the unit-energy (or scaled) forms of the transmitted waveforms for each binary message $m_i$, i=1, 2, namely $\sqrt{2}\phi_1(t)\cos(\omega_1 t)$ and $\sqrt{2}\phi_1(t)\sin(\omega_1 t)$. All received waveforms $r_j(t)$ 402 are processed similarly, with channel j using frequency $\omega_j$, for j=1, 2, ..., J. This projection may be carried out by multiplying $r_1(t)$ by the cosine expression above and by the sine expression above, as indicated at step 403 and 405, respectively, using the first baseband waveform ($\phi_1(t)$, followed by integration by integrators 406 of the product over the duration T of the baseband waveforms 402. A parallel operation may be carried out, as shown in FIG. 4, for the second baseband waveform ($\phi_2(t)$. The outputs of integrators 406 are typically called the projections of $r_1(t)$ onto each multiplying waveform.

In step 408, the cosine and sine projections are squared, and in step 410 the sums of these squared projections are formed separately on the ($\phi_1(t)$ and the ($\phi_2(t)$ branches of the calculations. The outputs 411 of this summation are multiplied by weights $w_1$ at step 412, with corresponding multiplications being carried out on other branches using weights $w_j$, where the weights $w_j$ may be calculated from the formula $$w_j = \frac{\frac{\gamma_j}{N_j}}{1+\gamma_j},$$

with $$\gamma_j = \frac{g_j \cdot E_j}{N_j},$$

for j values from 1 to J. Combiners 414a and 414b may produce an output signal 415 corresponding to the weighted digital signals 413 according to their digital state. For example, combiner 414a may output a signal 415 representative of the combination of weighted digital signals 413 corresponding to a digital "0" and combiner 414b may output a signal 415 representative of the combination of the weighted digital signals 413 corresponding to a digital "1". Comparator 416 may compare the outputs of combiners 414a and 414b and produce a digital output signal m̂ 418 that is responsive to the larger of the two signals 415. Digital output signal m̂ 418 may be an estimate of the message m transmitted to receiver 400.

Figure 5:
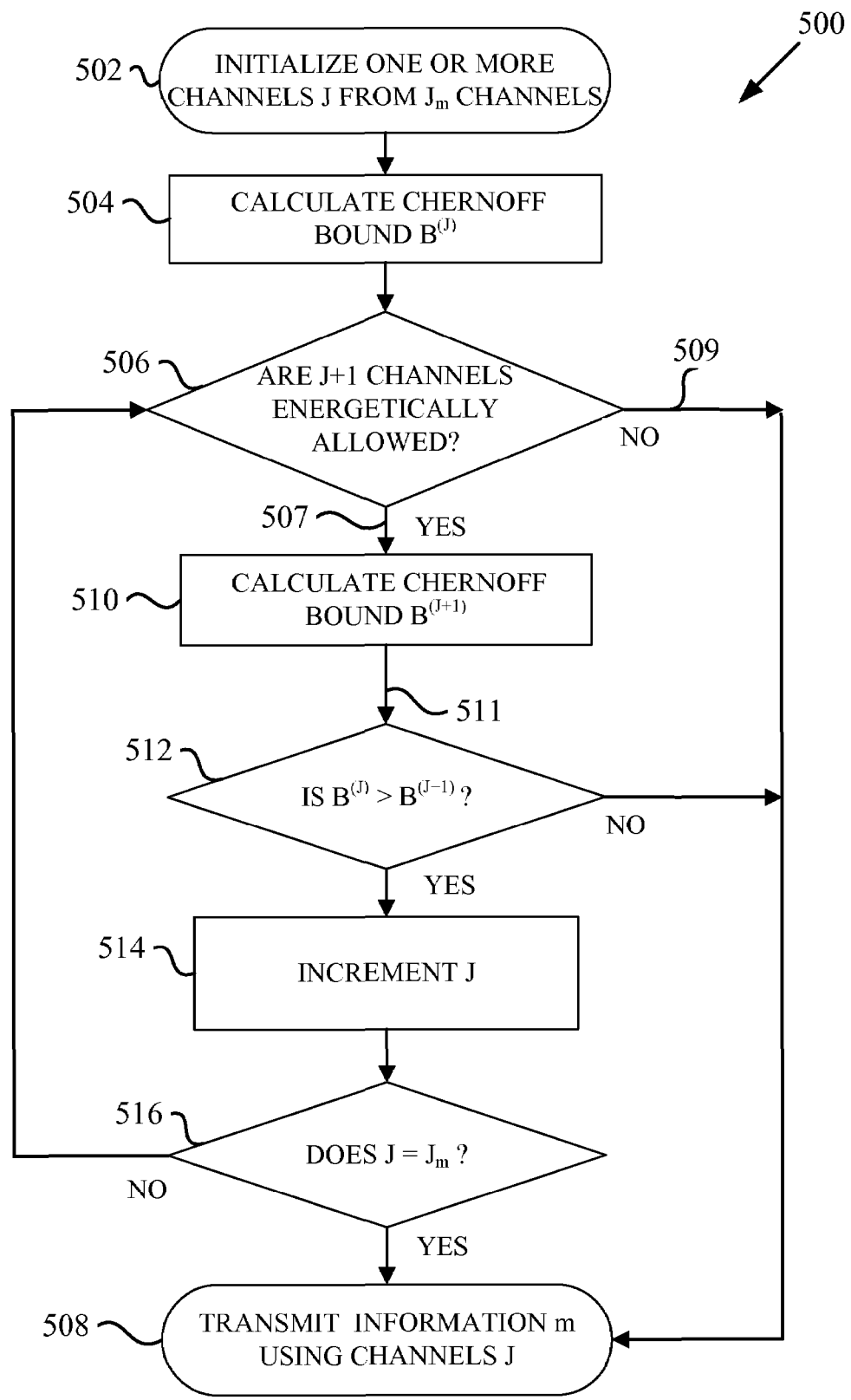
FIG. 5 shows a flowchart illustrating an energy-control and path selection method for communicating digital signal communications through diversity signaling, in accordance with an embodiment of the Energy-Control and Path-Selection Method and Apparatus for Digital Diversity Signaling.

FIG. 5 shows a flowchart of an embodiment of a method 500 for communicating information m using a constrained or fixed amount of transmission energy per bit $E_{tot}$, divided among diversity channels J, that minimizes the Chernoff bound (right-hand side of equation 2). Calculations shown in FIG. 5 may be performed based on given values for $E_{tot}$ and $\beta_j$, for j=1, 2, ..., $J_m$. Calculations shown in FIG. 5 may also be based on the channels J being numbered or labeled in order from best to worst channel SNR $\beta_j$, such that $\beta_1 \geq \beta_2 \geq \ldots \beta_{Jm}$. One implementation of method 500 may determine the optimum number of diversity channels J to use, while minimizing the Chernoff bound and subject to the constrained energy per bit available, by performing an iterative search as set forth in FIG. 7. Further, the calculation of channel energies per bit $E_j$ for any specific number of diversity channels J may be performed in accordance with equation 1 and FIG. 1.

Method 500 may begin at step 502, with the initialization of a trial or prospective set of one or more channels J from $J_m$ channels. The $J_m$ channels may be diversity channels. In some embodiments of method 500 one channel J may be initialized. In other embodiments of method 500, step 502 involves initializing channels J equal to values greater than one, depending on the communication system constraints. Next, method 500 may proceed to step 504, where a Chernoff bound $B^{(J)}$ may be calculated for the channels J. Step 504 may include calculating a SNR, $\gamma_j$, for each of the channels J, where $\gamma_j=\beta_j E_j$. The Chernoff bound $B^{(J)}$ may be calculated according to the equation $$B^{(J)} = \prod_{j=1}^{J} \frac{4(1+\gamma_j)}{(2+\gamma_j)^2},$$

an equivalent expression to the right-hand side of equation 1, where $$\gamma_j = \frac{g_j \cdot E_j}{N_j},$$

for each of the channels j, $E_j$ is the channel energy per bit, $N_j$ is channel noise, and $g_j$ is channel transmission loss. Some embodiments of step 504 may include the step of calculating a channel energy per bit $E_j$ for each channel j of the channels J such that $$\sum_{j=1}^{J} E_j$$

is within a fractional tolerance δ of, or equal to, the constrained amount of transmission energy per bit available $E_{tot}$.

Step 506 may next involve determining whether J+1 channels may be energetically allowed, where J+1 is a positive integer. Step 506 is discussed more in detail with respect to FIG. 6. If it is determined at step 506 that J+1 channels are not allowed, then method 500 proceeds to step 508, where information m is transmitted using channels J. Information m may be transmitted by a transmitter having similar features as the transmitters shown in FIG. 2 and FIG. 3. At step 508 information m is transmitted using the channels J, with each channel j having a channel energy per bit allocation of $E_j$. Multiple bits may be transmitted at step 508 before it is necessary to repeat method 500 due to changes in the properties of the channels J that affect the β values or the number of available channels $J_m$, such properties as channel noise $N_j$ and/or channel transmission loss $g_j$ over time.

If it is determined at step 506 that J+1 channels are allowed, method 500 proceeds, along flow path 507, to step 510. Step 510 may involve calculating a Chernoff bound $B^{(J+1)}$ for channels 1 through J+1. Some embodiments of step 510 may include the step of calculating a channel energy per bit $E_j$ for each of the J+1 channels. The calculation of the channel energies per bit $E_j$ may be performed in accordance with equation 1 and FIG. 1, as well as the iterative adjustment of the parameter denoted λ therein, to satisfy the condition that $$\sum_{j=1}^{J+1} E_j$$

is within a fractional tolerance δ of, or equal to, the constrained amount of transmission energy per bit available $E_{tot}$. The adjustment of λ is described in more detail with reference to FIG. 7. The Chernoff bound $B^{(J+1)}$ may be calculated according to the equation $$B^{(J+1)} = \prod_{j=1}^{J+1} \frac{4(1+\gamma_j)}{(2+\gamma_j)^2},$$

an equation similar to that for calculating Chernoff bound $B^{(J)}$, with J+1 replacing J.

Following step 510, method 500 may proceed along flow path 511 to step 512. Step 512 may involve a determination whether $B^{(J)} > B^{(J+1)}$. Alternatively at step 512, it may be determined whether $B^{(J)} \leq B^{(J+1)}$. Step 512 seeks to discover whether the use of J+1 channels for transmission of a bit is superior to the use of channels J, by determining whether J+1 channels yield a smaller Chernoff bound on the probability of a bit-error than do channels J. If at step 512 it is determined that $B^{(J)} \leq B^{(J+1)}$, meaning that J+1 channels yield a larger Chernoff bound, method 500 proceeds to step 508 to transmit information m using channels J. If instead, step 512 determines that $B^{(J)} > B^{(J+1)}$, meaning that J+1 channels yield a smaller Chernoff bound, method 500 proceeds to step 514. At step 514 the channels J are incremented. As an example, the channels J may be incremented by one. Following step 514 method 500 proceeds to step 516, where it is determined whether $J=J_m$. If J is not equal to $J_m$, meaning that more channels are available to be used, method 500 returns to step 506 to determine whether J+1 channels are energetically allowed. The return of method 500 to step 506 represents the iterative testing of successively more channels until one of two conditions is met, namely: 1) the next added channel J+1 degrades performance, or 2) there are no more channels available, meaning $J+1>J_m$, and using channels J is superior to using any fewer channels. If it is determined at step 516 that $J=J_m$, meaning that there are no additional channels that may be used, method 500 proceeds to step 508 to transmit information m using channels J.

Figure 6:
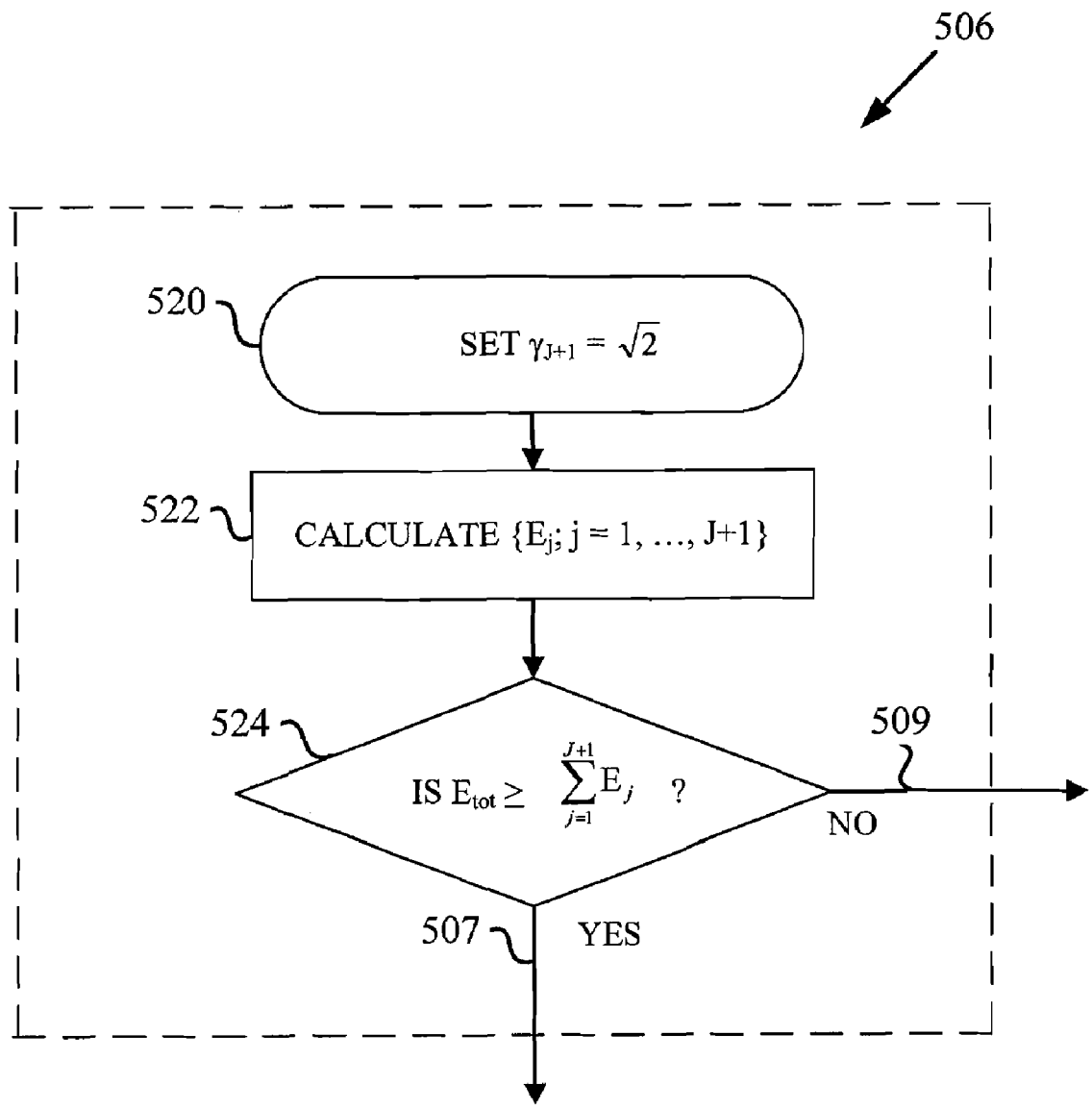
FIG. 6 shows a flowchart illustrating an embodiment of step 506 as shown in FIG. 5.

FIG. 6 shows a flowchart illustrating an embodiment of step 506 as shown in FIG. 5. One embodiment of step 506 may involve a determination as to whether J+1 channels are allowed, given the constraint that $$\sum_{j=1}^{J+1} E_j$$

is within a fractional tolerance δ of, or equal to, the constrained amount of transmission energy per bit available $E_{tot}$. Step 506 may begin at step 520, where $\gamma_{J+1}$ may be set equal to $\sqrt{2}$. Setting $\gamma_{J+1}$ equal to $\sqrt{2}$ may serve to identify the maximum λ value and the minimum required energy value to transmit a bit using the J+1 number of channels. According to equation 1, setting $\gamma_{J+1}$ equal to $\sqrt{2}$ implies that $\lambda = \beta_{J+1} f_m$, where $f_m$ denotes the maximum of the function f(γ) shown in FIG. 1. Using $\lambda = \beta_{J+1} f_m$, the remaining equations of the form of equation 1, for j=1, 2, . . . , J, may then be solved to determine the other γ values, $\gamma_j$ for j=1, 2, . . . J. After step 520, step 506 may proceed to step 522 to calculate channel energies per bit $E_j$ for j=1, 2, . . . , J+1. Step 522 may involve calculating the $\gamma_j$ values for j=1, 2, . . . J+1, in which each $\gamma_j$ satisfies the equation $$f(\gamma_j) = \frac{\beta_{J+1} f_m}{\beta_j},$$

taking the solution where $\gamma_j > \sqrt{2}$. From the set of values of $\gamma_j$, the transmitted energies $E_j$ on each of the J+1 channels may be calculated according to the equation $$E_j = \frac{\gamma_j}{\beta_j}.$$

Following step 522, method 500 may proceed to step 524. In step 524, the J+1 energies calculated in step 522 may be added, with the sum then compared to $E_{tot}$. If the sum of the channels' transmitted energies is less than or equal to $E_{tot}$, there is sufficient energy to use channels 1 though J+1 and step 506 may proceed along flow path 507 to step 510 as shown in FIG. 5, where the energies are recalculated to satisfy the energy constraint, to within some tolerance, by adjusting the value of $\lambda$ as described in connection with FIG. 7. If the sum of the energies calculated in step 522 is greater than $E_{tot}$, step 506 proceeds along flow path 509 to step 508 as shown in FIG. 5. If the sum of the energies calculated in step 522 is greater than $E_{tot}$, it is not possible to satisfy the set of equations of the form of equation 1 using J+1 channels with the available energy, as the assumed value of $\sqrt{2}$ is the smallest possible value of $\gamma_{J+1}$, corresponding to the largest possible value of $\lambda$, and hence yields the smallest value for the sum of the energies on each channel.

Figure 7:
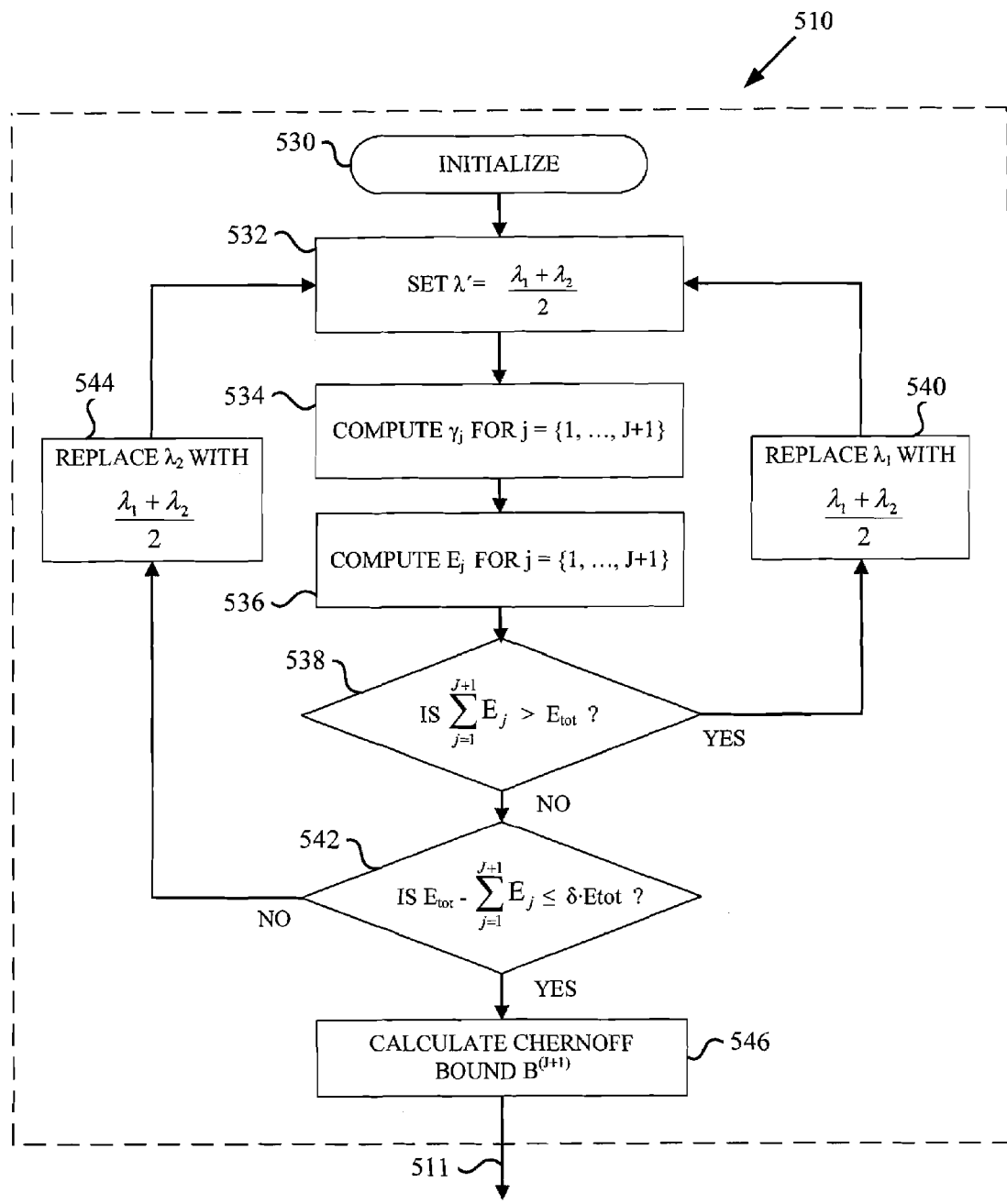
FIG. 7 shows a flowchart illustrating an embodiment of step 510 as shown in FIG. 5.

FIG. 7 shows a flowchart of step 510 of FIG. 5. Step 510 may begin at step 530, where a bifurcating search may be commenced by initializing a lower and upper bound, or limit, on the range of values of $\lambda$, the constant appearing in equation 1 and FIG. 1. The lower bound may be denoted $\lambda_1$ and the upper bound may be denoted $\lambda_2$. The iterative search successively halves the region in which $\lambda$ may be, until the energy-constraint is satisfied to within some prescribed tolerance, for the value of $\lambda$ at the midpoint of the range (halfway between the upper and lower bound). The initial bounds of $\lambda_1$ and $\lambda_2$ may be calculated in step 530 using the formulas $\lambda_1 = \beta_1[f(\beta_1 E_{tot})]$ and $\lambda_2 = \beta_{J+1} f_m$, where $f_m$ denotes the maximum value of the function $f(\gamma)$, as discussed in connection with equation 1 and FIG. 1, $\beta_j$ denotes the ratio of the transmission gain $g_j$ divided by the noise power spectral density $N_j$ on channel j, and $E_{tot}$ denotes the available energy to transmit a bit.

The formulas for $\lambda_1$ and $\lambda_2$ above correspond respectively to two extreme or limiting cases, as follows. In general, given values of the channels' properties $\beta_j$ for j=1, 2, ... $J_m$, the set of equations represented by equation 1 yields specific values for $\gamma_j$ for any given value of $\lambda$, as indicated by FIG. 1, under the condition that the solution of equation 1 greater than $\sqrt{2}$ is taken. As $\lambda$ increases in equation 1, the solution $\gamma_j$ decreases, which means that $E_j$ also decreases. Hence, increasing $\lambda$ causes the sum of transmitted energies $$\sum_{j=1}^{J} E_j$$

to decrease for any choice of J. This sum is equal to $E_{tot}$ only for certain pairs of values of J and $\lambda$.

It is not possible to determine $\lambda$ from any simple formula so as to satisfy the energy constraint for a given value of J, but in one limiting case, all available energy would be used on channel 1, in which case equation 1 gives $\lambda = \beta_1[f(\beta_1 E_{tot})]$, representing a lower limit on the value for $\lambda$, as seen from FIG. 1, because $\gamma_1$ in general must be less that $\beta_1 E_{tot}$. Thus, this is denoted as $\lambda_1$. In a second limiting case, channel J+1 might be allowed energetically, but with the smallest possible value for $\gamma_{J+1}$, namely $\sqrt{2}$, in which case equation 1 gives $\lambda = \beta_{J+1} f_m$, representing an upper limit on the value of $\lambda$, as seen in FIG. 1, because in general $\gamma_{J+1}$ must be greater than $\sqrt{2}$. Hence, this is denoted as $\lambda_2$.

In step 532, the midpoint of the range $(\lambda_1, \lambda_2)$ may be calculated as the average of the upper and lower limits and denoted $\lambda'$. In step 534, $\gamma_j$ values for j=1, 2, ... J+1 may be calculated by solving each equation of the form of equation 1 for $\gamma_j$, taking the solution greater than $\sqrt{2}$. Then, $E_j$ may be calculated using the formula $$E_j = \frac{\gamma_j}{\beta_j}$$

in step 536, for j=1, 2, ..., J+1. In step 538, the energies calculated in step 536 may be summed and this sum may be compared to $E_{tot}$. If this sum exceeds $E_{tot}$, the current trial value of $\lambda$, namely $\lambda'$, is too small, because the sum decreases as $\lambda$ increases (keeping J+1 fixed). Hence, the correct value of $\lambda$, satisfying the energy constraint, must be to the right of (larger than) $\lambda'$, and in the right half of the initial interval $(\lambda_1, \lambda_2)$. In this case, step 510 proceeds to step 540, which may involve replacing the lower limit $\lambda_1$ by the midpoint, reducing the region of search to the right half of the initial interval. Following step 540, step 510 may proceed to step 532 to repeat the search.

If the sum of energies is not greater than $E_{tot}$, step 510 may proceed to step 542, which may involve performing a test for completion by determining whether the sum of energies is within a prescribed fractional tolerance, $\delta$, of $E_{tot}$. If the sum of energies differs from $E_{tot}$ by less that $\delta E_{tot}$, the energy constraint may be considered to be satisfied. In this instance, step 510 is essentially complete because the set of energies $\{Ej\}$ have been found that minimize the Chernoff bound and meet the energy-constraint for channels 1 to J+1. Following step 542, step 510 may proceed to calculate the Chernoff bound, $B^{(J+1)}$ according to the equation $$B^{(J+1)} = \prod_{j=1}^{J+1} \frac{4(1+\gamma_j)}{(2+\gamma_j)^2}$$

at step 546. Following step 546, step 510 may proceed along flow path 511 to step 512 of FIG. 5. However, if the test in step 542 finds that the sum of energies differs from $E_{tot}$ by more that $\delta E_{tot}$, the value $\lambda'$ is too large, because decreasing $\lambda$ increases the sum of energies (which is currently too small). Hence, the correct value of $\lambda$ must be to the left of (smaller than) $\lambda'$, and in the left half of the initial interval $(\lambda_1, \lambda_2)$. In this case, step 510 may proceed to step 544, where the upper limit $\lambda_2$ is replaced by the midpoint, reducing the region of search to the left half of the initial interval. After step 544, step 510 may proceed to step 532 to repeat the search.

Each successive pass through the steps of FIG. 7 halves the region of search for the correct value for $\lambda$, resulting in a fast convergence of method 500 for finding the optimum energies and number of channels, taking the Chernoff bound as the measure of performance, given a fixed or constrained energy for transmission of a bit.

Figure 8:
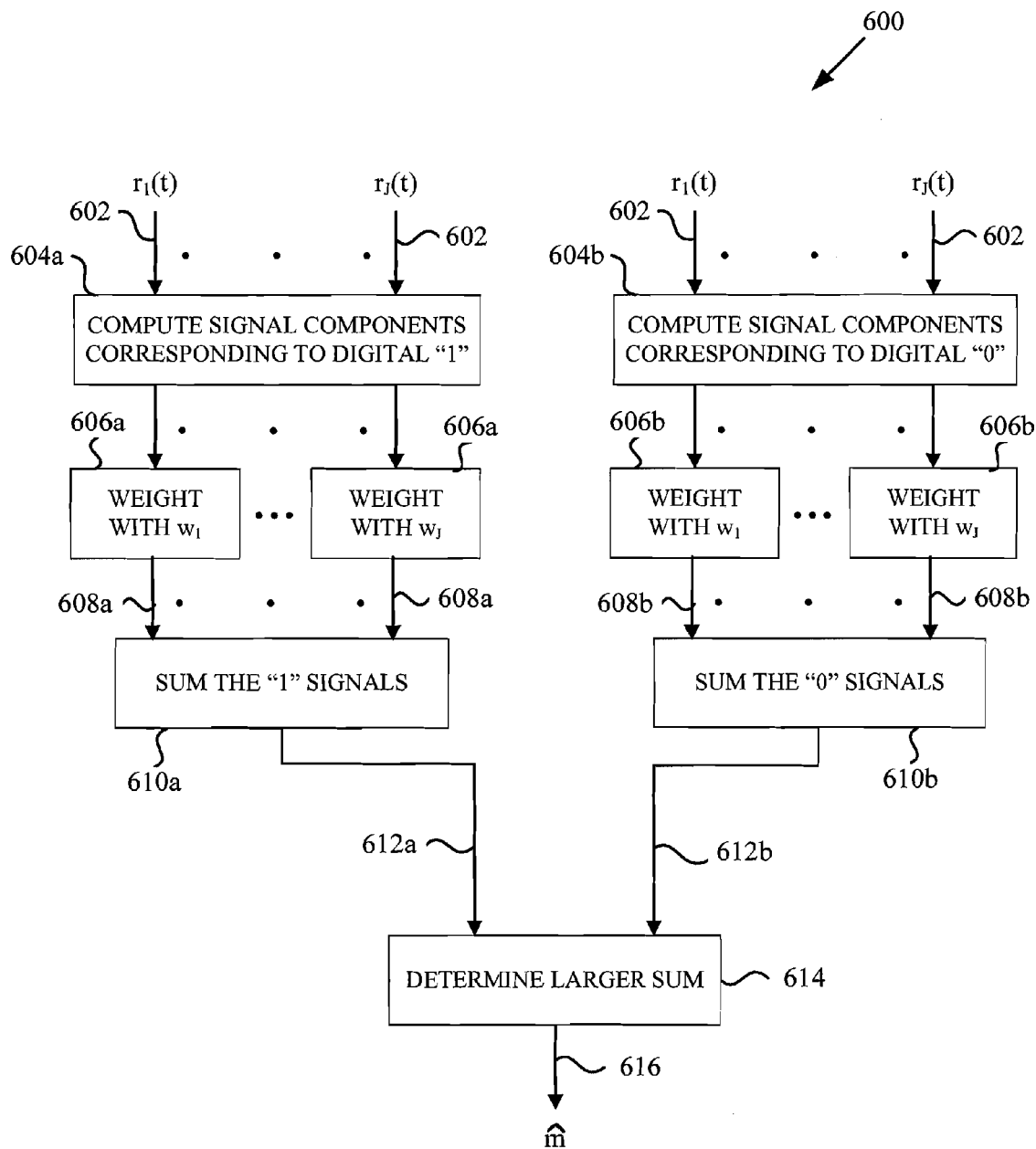
FIG. 8 shows a flowchart illustrating steps of a method for receiving digital signal information through diversity signaling, in accordance with an embodiment of the Energy-Control and Path-Selection Method and Apparatus for Digital Diversity Signaling.

FIG. 8 shows steps of a method 600 that may involve the receipt of the transmitted digital information m. Transmitted digital information m may be received as waveforms 602, represented by $r_1(t)$ through $r_J(t)$, on channels 1 through J. A receiver receiving waveforms 602 may either receive calculated $E_j$ and J values before the receipt of waveforms 602, or may itself calculate $E_j$ and J values based on the received waveforms 602. Waveforms 602 may be filtered along two paths—one path that looks for digital signal information corresponding to a first digital state, the other path that looks for digital signal information corresponding to a second digital state. By way of example, in a binary digital system the first and second digital states may correspond to a digital "0" and a digital "1". Next, steps 604a and 604b may compute the projections of the received waveforms 602, as described in connection with FIG. 4, onto the heterodyned baseband waveforms that correspond to the previously mentioned digital states. As an example, step 604a may compute projections corresponding to a digital "1" and 604b may compute projections corresponding to a digital "0". Following step 604, step 606 may involve weighting the filtered digital signals with a weight $w_j$ according to the channel energy allocation and the measurements of channel noise $N_j$ and channel transmission loss $g_j$. For example, $w_j$ may be calculated using the following:

$$w_j = \frac{\frac{\gamma_j}{N_j}}{1+\gamma_j}$$

where $$\gamma_j = \frac{g_j \cdot E_j}{N_j},$$

and where $g_j$ is transmission gain, $E_j$ is the transmitted energy, and $N_j$ is the noise power spectral density, all on channel j. Step 606a may involve weighting the filtered digital signals corresponding to a digital "1", while step 606b may involve weighting the filtered digital signals corresponding to a digital "0." The resultant weighted digital signals 608a and 608b may then be summed together at step 610. As an example, step 610a may sum the weighted digital signals corresponding to a digital "1" and step 610b may sum the weighted digital signals corresponding to a digital "0". The sums 612a and 612b may then be compared to one another in step 614. Step 614 may determine the larger of the two sums. If sum 612a is larger than sum 612b, the resulting output 616, represented by m̂, is set to a digital "1". If sum 612b is larger than sum 612a, the resulting output 616 is set to a digital "0". Steps 604 through 614 may then be repeated for the next bit or set of bits received.

The method for communicating digital signal information may be expanded to a system that includes more than just two digital states. The method may also be implemented using a variety of diversity techniques including frequency diversity, spatial diversity, time diversity, polarization diversity, and path diversity.

The embodiments of the Energy-Control and Path-Selection Method and Apparatus for Digital Diversity Signaling may be applied in various applications. One such use is within digital communications systems using radio waves, acoustics, optical signals, voltage or currents on wires, or any other manner of energy transmission in which the transmission paths between sender and receiver are subject to fading, making diversity signaling desirable or necessary. The embodiments may be used with remotely deployed, battery-powered systems used in environmental monitoring, submarine detection, underwater digital acoustic communication systems, ground-based vehicle surveillance, and spacecraft. When used in such systems, the embodiments may serve to maximize the system's lifetime due to the efficient energy use provided. The embodiments may also minimize the overall weight and cost of such systems.

The scope of the claims is not limited to the applications disclosed herein, but extends to other applications as may be contemplated by one with ordinary skill in the art.

We claim:

1. A method for communicating digital information comprising the steps of:

initializing one or more channels J from $J_m$ channels given a constrained amount of transmission energy per bit available $E_{tot}$;

calculating a Chernoff bound $B^{(J)}$ for the one or more channels J, wherein the step of calculating a Chernoff bound $B^{(J)}$ for the one or more channels J includes the step of calculating a channel energy per bit $E_j$ for each channel j of the one or more channels J such that $E_j$ is within a fractional tolerance $\delta$ of the constrained amount of transmission energy per bit available $E_{tot}$;

determining whether J+1 channels may be energetically allowed, where J+1 is a positive integer;

if the J+1 channels are energetically allowed, then:
calculating a Chernoff bound $B^{(J+1)}$ for the J+1 channels,
determining whether $B^{(J)}>B^{(J+1)}$,
if $B^{(J)}>B^{(J+1)}$, then:
incrementing the one or more channels J,
determining whether $J=J_m$,
if $J=J_m$, transmitting information m using the one or more channels J, and
if J is not equal to $J_m$, continuing to the step of determining whether J+1 channels may be energetically allowed, and
if $B^{(J)} \leq B^{(J+1)}$, then transmitting information m using the one or more channels J; and if the J+1 channels are not energetically allowed, transmitting information m using the one or more channels J.

2. The method for communicating digital information of claim 1, wherein the step of calculating a Chernoff bound $B^{(J)}$ for the one or more channels J includes the step of calculating a signal-to-noise ratio $\gamma_j$ for each of the one or more channels J.

3. The method for communicating digital information of claim 1, wherein the Chernoff bound $B^{(J)}$ is calculated according to the equation $$B^{(J)} = \prod_{j=1}^{J} \frac{4(1+\gamma_j)}{(2+\gamma_j)^2},$$

where $$\gamma_j = \frac{g_j \cdot E_j}{N_j},$$

for each of the channels j, $E_j$ is the channel energy per bit, $N_j$ is channel noise, and $g_j$ is channel transmission loss.

4. The method for communicating digital information of claim 3, wherein the channel noise $N_j$ is the power spectral density of noise.

5. The method for communicating digital information of claim 3, wherein the channel transmission loss $g_j$ is the mean transmission loss.

6. The method for communicating digital information of claim 1, wherein the step of calculating a Chernoff bound $B^{(J+1)}$ for the J+1 channels includes the step of calculating a channel energy per bit $E_j$ for each channel j of the J+1 channels such that $$\sum_{j=1}^{J+1} E_j$$

is within a fractional tolerance $\delta$ of the constrained amount of transmission energy per bit available $E_{tot}$.

7. The method for communicating digital information of claim 1, wherein the Chernoff bound $B^{(J+1)}$ is calculated according to the equation $$B^{(J+1)} = \prod_{j=1}^{J+1} \frac{4(1+\gamma_j)}{(2+\gamma_j)^2},$$

where $$\gamma_j = \frac{g_j \cdot E_j}{N_j},$$

for each of the channels j, $E_j$ is the channel energy per bit, $N_j$ is channel noise, and $g_j$ is channel transmission loss.

8. The method for communicating digital information of claim 1, wherein the channel energy per bit $E_j$ for each channel j of the one or more channels J is calculated by making use of the function, $$\frac{\gamma_j}{(1+\gamma_j)(2+\gamma_j)},$$

wherein $\gamma_j$ is a non-negative number.

9. The method for communicating digital information of claim 1, wherein the channel energy per bit $E_j$ for each channel j of the one or more channels J is calculated according to the equation $$E_j = \frac{\gamma_j}{\beta_j},$$

where $\gamma_j$ is the average received signal-to-noise ratio and $\beta_j$ is a property of channel j defined by $$\beta_j = \frac{g_j}{N_j},$$

where $g_j$ is the mean transmission loss and $N_j$ is the one-sided power spectral density of noise.

10. The method for communicating digital information of claim 9, wherein $\gamma_j$ is calculated according to the equations $$\frac{\gamma_j}{(1+\gamma_j) \cdot (2+\gamma_j)} = \frac{\beta_J \cdot f_m}{\beta_j}$$

and $\gamma_j > \sqrt{2}$ where $f_m$ is the maximum value of $f(\gamma)$, where $$f(\gamma) = \frac{\gamma}{(1+\gamma) \cdot (2+\gamma)}.$$

11. The method for communicating digital information of claim 1 further comprising the step of adjusting the channel energy per bit $E_j$ of one or more of the one or more channels J such that each channel j of the one or more channels J has a channel energy per bit $E_j$, where $$\sum_{j=1}^{J} E_j$$

is within a fractional tolerance $\delta$ of a constrained amount of transmission energy per bit available $E_{tot}$, where $0 < \delta \leq 1$.

12. The method for communicating digital information of claim 11, wherein the step of adjusting the channel energy per bit $E_j$ of one or more of the channels j is performed by a bifurcating search responsive to channel noise $N_j$ and channel transmission loss $g_j$.

13. The method for communicating digital information of claim 1 further comprising the steps of:
receiving one or more waveforms with the transmitted information m on each channel j on a communications device;
producing a weighted digital signal for each channel j by weighting the received waveforms of each channel j according to the channel energy per bit $E_j$, channel noise $N_j$, and channel transmission loss $g_j$; and
producing a digital output signal $\hat{m}$ by combining the weighted digital signals for each channel j.

14. The method for communicating digital information of claim 13, wherein the weighted digital signals are produced by weighting the received waveforms with channel weights $w_j$, wherein $$w_j = \frac{\frac{\gamma_j}{N_j}}{1+\gamma_j},$$

wherein $$\gamma_j = \frac{g_j \cdot E_j}{N_j}.$$

15. The method for communicating digital information of claim 14 further comprising the steps of:
producing a first plurality of filtered digital signals corresponding to a first digital state by filtering the received waveforms of each channel j; and producing a second plurality of filtered digital signals corresponding to a second digital state by filtering the received waveforms of each channel j.

16. The method for communicating digital information of claim 1, wherein the step of determining whether J+1 channels may be selected, where J+1 is a positive integer, includes the steps of:
setting $\gamma_{j+1}$ equal to $\sqrt{2}$;
calculating the channel energy per bit $E_j$ for each channel j of the J+1 channels; and
determining whether $$E_{tot} > \sum_{j=1}^{J+1} E_j.$$

17. The method for communicating digital information of claim 1, wherein $$\sum_{j=1}^{J} E_j$$

is equal to the constrained amount of transmission energy per bit available $E_{tot}$, where $E_j$ is the channel energy per bit to be transmitted on each channel j.

18. The method for communicating digital signal information of claim 1, wherein each channel j of the one or more channels J has a channel energy per bit $E_j$ such that $E_1 \geq E_{j+1}$ when the one or more channels J are ordered from largest $\beta_j$ to smallest $\beta_j$, wherein $\beta_j = g_j/N_j$, where $g_j$ is the mean transmission loss and $N_j$ is one-sided power spectral density of noise.

19. A transmitter for communicating digital information comprising:
means for initializing one or more channels J from $J_m$ channels given a constrained amount of transmission energy per bit available $E_{tot}$;
means for calculating a Chernoff bound $B^{(J)}$ for the one or more channels J, wherein the step of calculating a Chernoff bound $B^{(J)}$ for the one or more channels J includes the step of calculating a channel energy per bit $E_j$ for each channel j of the one or more channels J such that $E_j$ is within a fractional tolerance $\delta$ of the constrained amount of transmission energy per bit available $E_{tot}$; and
means for determining whether J+1 channels may be energetically allowed, where J+1 is a positive integer, where:
if the J+1 channels are energetically allowed, the means for determining whether J+1 channels may be energetically allowed follows a method comprising the steps of:
calculating a Chernoff bound $B^{(J+1)}$ for the J+1 channels,
determining whether $B^{(J)} > B^{(J+1)}$,
if $B^{(J)} > B^{(J+1)}$:
incrementing the one or more channels J, and
determining whether $J = J_m$, if $J = J_m$, transmitting information m using the one or more channels J, and
if J is not equal to $J_m$, continuing to the step of determining whether J+1 channels may be energetically allowed, and
if $B^{(J)} \leq B^{(J+1)}$, transmitting information m using the one or more channels J; and
if the J+1 channels are not energetically allowed, then the means for determining whether J+1 channels may be energetically allowed follows a method comprising the step of transmitting information m using the one or more channels J.

20. A receiver comprising:
means for receiving digital information m on J channels, each channel j of the J channels having a channel energy per bit $E_j$ allocated from a constrained amount of transmission energy-per-bit available $E_{tot}$, the J channels corresponding to calculated Chernoff bounds and the channel energy per bit $E_j$ corresponding to channel noise $N_j$ and channel transmission loss $g_j$;
means for producing a weighted digital signal for each channel j by weighting one or more received waveforms, having digital information m, of each channel j according to the channel energy per bit $E_j$, the channel noise $N_j$, and the channel transmission loss $g_j$, where the weighted digital signals are produced by weighting the received waveforms with channel weights $w_j$, where $$w_j = \frac{\frac{\gamma_j}{N_j}}{1+\gamma_j},$$

wherein $$\gamma_j = \frac{g_j \cdot E_j}{N_j};$$

and
means for producing a digital output signal $\hat{m}$ by combining the weighted digital signals.

21. The receiver of claim 20 further comprising:
means for producing a first plurality of filtered digital signals corresponding to a first digital state by filtering the received waveforms of each channel j;
means for producing a second plurality of filtered digital signals corresponding to a second digital state by filtering the received waveforms from each channel j;
means for determining the larger of the first plurality of filtered digital signals and the second plurality of filtered digital signals; and
means for producing a digital output signal $\hat{m}$ based upon the determination of the larger of the first plurality of filtered digital signals and the second plurality of filtered digital signals.

* * * * *